United States Patent
Galaitsis (10) Patent No.: US 7,767,301 B2
(45) Date of Patent: Aug. 3, 2010

(54) HETEROGENEOUS LYOPHOBIC SYSTEM FOR ACCUMULATION, RETRIEVAL AND DISSIPATION OF ENERGY

(75) Inventor: Anthony Galaitsis, Lexington, MA (US)

(73) Assignee: Raytheon Company, Waltham, MA (US)

( * ) Notice: Subject to any disclaimer, the term of this patent is extended or adjusted under 35 U.S.C. 154(b) by 1359 days.

(21) Appl. No.: 11/222,140

(22) Filed: Sep. 8, 2005

(65) Prior Publication Data
US 2006/0246288 A1      Nov. 2, 2006

Related U.S. Application Data

(60) Provisional application No. 60/608,388, filed on Sep. 8, 2004.

(51) Int. Cl.
*B32B 1/00* (2006.01)
(52) U.S. Cl. .......... 428/402.21; 428/402; 428/403; 428/406; 60/508
(58) Field of Classification Search .......... 428/402; 427/212
See application file for complete search history.

(56) References Cited

U.S. PATENT DOCUMENTS

| | | | | |
|---|---|---|---|---|
| 5,079,600 A | * | 1/1992 | Schnur et al. | 257/750 |
| 5,776,748 A | * | 7/1998 | Singhvi et al. | 435/180 |
| 6,052,992 A | * | 4/2000 | Eroshenko | 60/509 |
| 6,454,047 B1 | * | 9/2002 | Galaitsis | 181/254 |
| 7,021,420 B2 | * | 4/2006 | Galaitsis | 181/232 |

* cited by examiner

*Primary Examiner*—Monique R Jackson
(74) *Attorney, Agent, or Firm*—Daly, Crowley, Mofford & Durkee, LLP (57) ABSTRACT

A system for accumulating mechanical energy comprising a carrier fluid and a plurality of porous particles distributed in the carrier fluid is disclosed. The plurality of particles are broken fragments of a lyophilic starting material having at least one pore open to an exterior of the starting material and defined by an interior surface of the starting material, wherein the exterior and interior surfaces of the lyophilic starting material comprise a coating that is lyophobic with respect to the carrier fluid.

13 Claims, 7 Drawing Sheets

HETEROGENEOUS LYOPHOBIC SYSTEM FOR ACCUMULATION, RETRIEVAL AND DISSIPATION OF ENERGY

This application claims priority from U.S. Provisional Application No. 60/608,388, filed Sep. 8, 2004, the entire contents of which are incorporated herein by reference.

This invention was made with U.S. Government support awarded through the Office of Naval Research under Contract No. N00014-03-C-0328. The U.S. Government may have certain rights in this invention.

FIELD OF THE INVENTION

This invention relates to a system for accumulating incident energy from a high energy pulse such as the impact from a moving object or an incident shock wave.

BACKGROUND OF THE INVENTION

High energy impacts may be experienced in vehicle collisions, airplane and train crashes, underwater shocks applied to ships and sea-based oil platforms, highway barrier collisions, abrupt, high level forces applied to airplane landing gear components or between components of any vehicles or machinery, and other physical interactions and may result in extensive damage to the applicable equipment (e.g., the vehicle, ship, airplane, roadside barrier, etc.), and injury to passengers and personnel. Energy transferred during such interactions may either be reflected towards the source applying the energy, accumulated by the receiver, transmitted through the receiver to surroundings, or some combination of these. Accumulated energy may be dissipated, stored and retrieved, and/or converted to another form of energy and used for a desired purpose.

Traditional techniques for protecting objects from being damaged by incident energy pulses are sometimes applied to or integrated into materials used for protecting the equipment. Such materials include the use of elastically deformable components, e.g., coil springs, foam, sand, gels, rubber or other elastomeric materials, welds or other metal anchors, or shock absorbing pads with polyurethane or other similar materials, etc.

Unfortunately, current materials tend to have limited utility in storing, dissipating and releasing the energy from forces applied at high frequencies, high magnitude loads (forces or pressures), or a combination of these in a controlled manner. For example, the energy from vehicle collisions is typically dissipated in part by the vehicle bumper, but much of the energy is reflected back to the vehicle and absorbed by the vehicle chassis and transmitted to the surroundings, resulting in vehicle damage or passenger injury as well as damage to surrounding objects and other people. For high speed collisions, current bumpers are largely unable to prevent extensive damage to the vehicle and serious injuries of the passengers. Similarly, underwater blasts may compromise the integrity of, or permanently disable, ships, submarines, and other underwater vehicles or structures. The effects of collisions and damage arising from inadequate protective equipment are manifested in other areas beyond transportation. For example, air-dropped articles or equipment subject to abrupt and high loads are often mechanically compromised or irreparably damaged upon arrival at appointed locations.

Although improvements have been developed in recent years, for example as shown in U.S. Pat. No. 6,052,992 (the specification of which is incorporated by reference herein), further improvements are needed still for mitigating the effects of high-load, high frequency impacts caused by collisions or incident shock waves.

SUMMARY OF THE INVENTION

In one aspect, the invention is a system for accumulating mechanical energy. This system includes a carrier fluid and a plurality of particles distributed therein. The particles each have at least one pore open to an exterior of the particle. The at least one pore is defined by an internal surface of the particle. An exterior surface of the particle is lyophilic with respect to the carrier fluid and the interior surface of the particle is lyophobic with respect to the carrier fluid.

This system may further include a sealed hollow shell of a compliant material in which the carrier fluid and the particles are contained. The system may include a plurality of such shells. The hollow shells may be embedded in a compliant matrix material or in a second carrier fluid. The carrier fluid and the particles may be contained in a piston cylinder. The exterior surface of the particles may be hydrophilic and the internal surface may be hydrophobic. The system may be capable of accumulating energy from an external force applied at a pressure of at least 50 psi while transmitting less than about 70% of the energy to an object about which the system is disposed. The external force may be applied at a frequency of at least about 10 Hz.

In another aspect, the invention is a particle for use in a system for accumulating mechanical energy, the system comprising a carrier fluid in which the particle is suspended. The particle includes at least one pore that is open to an exterior of the particle. That pore is defined by an internal surface of the particle, and an exterior surface of the particle is lyophilic with respect to a fluid to which the interior surface is lyophobic. The particle material may be lyophilic, and the particle may include a lyophobic coating disposed over at least a portion of the interior surface. The particle may include at least one interconnected network of pores. The particle size may be less than 2500 mesh, between 2500 mesh and 4 mesh, or greater than 4 mesh. The pore diameter may be between about 2 and about 200 nanometers. The particle may include a plurality of pores, and the particle may be between about 20 and about 80% porous. The ratio of the particle diameter to the pore diameter may be from about 2:1 to about 5000:1 or greater.

In another aspect, the invention is a method of producing a plurality of particles. The method includes providing a precursor particle having at least one pore open to an exterior of the precursor particle, the at least one pore being defined by an internal surface of the precursor particle, coating the exterior surface of the precursor particle and at least a portion of the interior surface of the precursor particle with a material that is lyophobic with respect to a predetermined fluid, and fracturing the precursor particle into a plurality of particles, thereby producing heterogeneous particles having exterior surfaces that are substantially uncoated with the lyophobic material. The external surface of the heterogeneous particles may be hydrophilic and the coated internal surface may be hydrophobic.

BRIEF DESCRIPTION OF THE DRAWING

The invention is described with reference to the several figures of the drawing, in which.

FIGS. 3A and B are scanning electron micrographs of controlled porosity glass for use with an exemplary embodiment of the invention.

FIGS. 3 C-F are schematic diagrams of the encapsulation of porous particles and a carrier fluid according to an exemplary embodiment of the invention.

FIG. 6 is a set of graphs showing the pressure measured by various sensors disposed in the shock tube of FIG. 5 during the system's excitation by a shock wave.

DETAILED DESCRIPTION OR CERTAIN PREFERRED EMBODIMENTS

In one embodiment, the invention is a system for accumulating mechanical energy resulting from an impact. A plurality of porous particles is distributed in a carrier fluid. At least a portion of the pores in each particle is open to an exterior of the particle, and interior surfaces of the particle defining those pores are lyophobic (e.g., non-wetting or fluid-repellant) with respect to the carrier fluid, while an exterior surface of the particle is lyophilic (e.g., wetting) with respect to the carrier fluid.

The disclosure of Eroshenko in U.S. Pat. No. 6,052,992, the contents of which are incorporated herein by reference, provides some context. Briefly, the particles and the fluid are both nearly incompressible. However, the fluid does not flow into the pores spontaneously because of the repulsion between the surface of the non-wetting pores and the fluid. The interior portion of the otherwise empty (e.g., fluid-free) pores may contain air or be under vacuum. However, when a pressure greater than the Laplace pressure, $P_L$, is applied on the mixture (see FIG. 1), the fluid is forced into the pores. When the pressure is released, it becomes energetically unfavorable for the fluid to remain in the pores because of the repulsion between the fluid and the non-wetting pore walls, and the fluid flows out. The skilled artisan will recognize that the energy accumulation into the system is proportional to the increase in the contact area of the fluid with the non-wetting pore walls. The ability of the system to accumulate energy partially depends on the access of the fluid to the pores. The skilled artisan will recognize that a reduced particle size will result in an increase in the external surface area of the particles (per unit mass), which will facilitate energy accumulation by the system by decreasing pore length and increasing the number of access points to the pores at the external surfaces of the particles. Thus, for a given linear amount of porosity in a given volume of particles, a decrease in average particle size will decrease the time required for the fluid to fill the pores.

However, this increase in surface area alone is not sufficient to increase energy accumulation (either by increasing the capacity or the speed of the system). The fluid must, in the first instance, have immediate access to the pores. In the disclosure of Eroshenko, the particles are lyophobic with respect to the fluid. This causes the particles to agglomerate. The particles are sufficiently small that their flocculation results in the generation of a porous mass that itself must be infiltrated by the fluid before the fluid can penetrate into the pores, thus negating the advantages gained by decreasing particle size. Because particles produced according to an embodiment of the present invention have a lyophilic exterior surface, the fluid wets the exterior of the particles in the absence of an applied pressure and is able to begin penetrating the pores of all the particles when the applied pressure exceeds the Laplace pressure.

The agglomeration of the particles also creates difficulty in manufacturing. The flocculate tends to float in the fluid (because the pores and inter-particle voids are either completely empty (e.g., under vacuum) or filled with air, either at ambient pressure or under partial vacuum), making it difficult to encapsulate the particles and fluid using standard manufacturing techniques.

Particle Production

In one embodiment, the particles are produced by providing a porous bulk starting material. All the surfaces of the material, interior and exterior, are rendered lyophobic with respect to the expected carrier fluid. For example, if the carrier fluid is water, then the surfaces are rendered hydrophobic. For a glass or other hydrophilic starting material, the surfaces are thus coated with a hydrophobic material. The bulk starting material is then broken into smaller particles. The newly exposed exterior surfaces of the smaller particles have the composition of the uncoated starting material. For example, for a glass starting material, the exterior surfaces of the ground particles will be the hydrophilic glass surface, while the interior surfaces surrounding the pores will have the hydrophobic coating. The ground material has substantially the same volume as the starting material, but a significantly greater surface area, magnifying the access of the carrier fluid to the pores.

A small fraction of the particles will include a portion of the exterior surface, with its lyophobic coating. However, for each of these particles, only a small portion of their surfaces will include the coating. The small fraction of the total exterior surface area of the particles that remains lyophobic has a negligible effect on performance. It is not necessarily desirable that the coating be such that it will be abraded from the exterior surface of the particles as they are ground.

The particle shape is not critical to the functioning of the system. The particles may have rounded edges if they are ground, but this is not necessary, and different production methods may result in different particle shapes, for example, spherical, ovoid, cylindrical, or polyhedral. Exemplary particles are shown in FIG. 3B. Non-centrosymmetric particles are also appropriate for use according to an embodiment of the invention. In one embodiment, the particles are small, to maximize the available external surface area for a given volume of particles. However, the particles should be sufficiently large to accommodate fluid flow into and out of pores. The pores may form one or more interconnected networks.

Generally, a reduced particle size facilitates the liquid/pore interaction due to the increased amount of external particle surface per unit mass available for contact with the fluid. This is particularly beneficial for short duration pulses where there is very little time available for the liquid penetration into the lyophobic pores. The optimal particle size will depend in part on the frequency and the magnitude of the impact (e.g., is the energy applied slowly or quickly), and may range from 2500 mesh or smaller (e.g., 5 micron or less) to 4 mesh or greater (e.g., 4.76 mm), for example, between 2500 mesh and 400 mesh, between 400 mesh and 140 mesh, between 140 mesh and 60 mesh, between 60 mesh and 30 mesh, between 30 mesh and 16 mesh, or between 16 mesh and 4 mesh.

Figure 1:
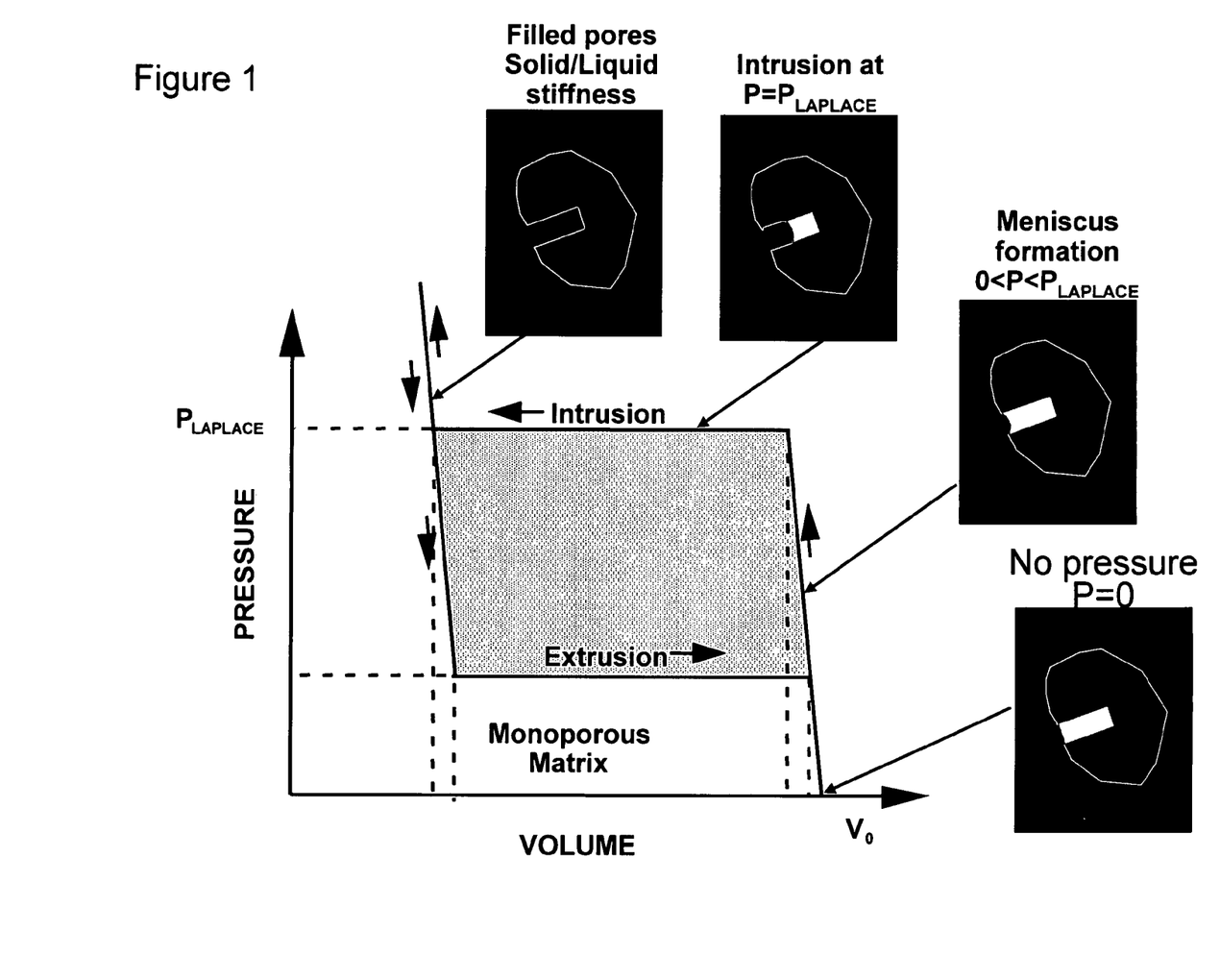
FIG. 1 is a schematic of the flow of fluid into a porous particle showing the accumulation of energy by the flow of fluid into the pores.
Figure 2:
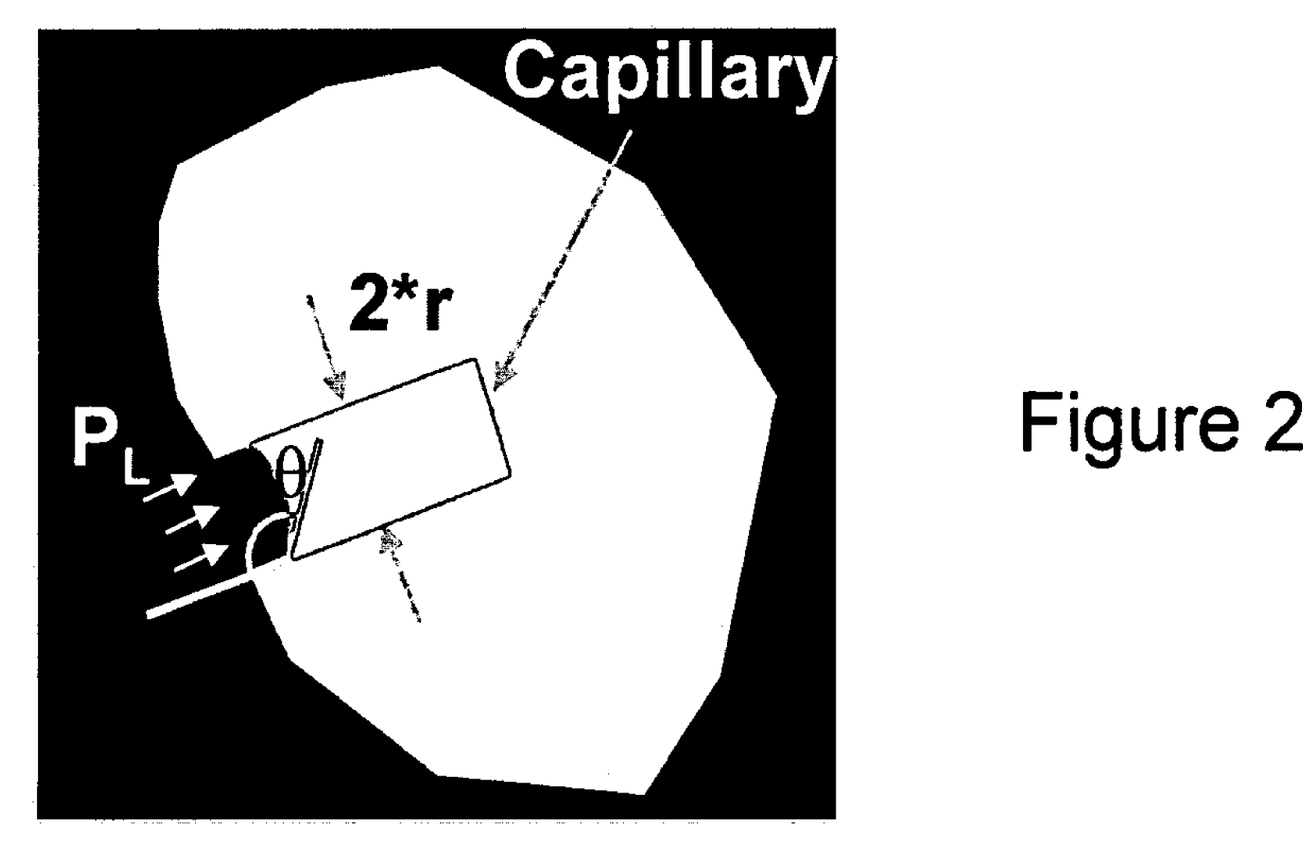
FIG. 2 is a schematic diagram illustrating the interaction between a fluid and a lyophobic pore.

The pore size and other fluid/particle properties may be manipulated to optimize the Laplace pressure for the system. The Laplace pressure is given by $$P_L = \frac{2\sigma|\cos\theta|}{r}$$

where r is the pore radius, $\sigma$ is the surface tension of the fluid and $\theta$ is the acute angle defined by the advancing contact between the fluid and the pore wall (see FIG. 2). The angle $\theta$ is generally greater than 90 degrees for lyophobic liquid/solid pairs. In one embodiment, the pores are approximately uniform in cross-sectional area. In this embodiment, the Laplace pressure is about the same for all of the pores, and fluid is able to penetrate substantially all of the pores when the applied pressure reaches the Laplace pressure, thus displaying the intrusion plateau in the pressure-volume responses curve (see FIG. 1). One skilled in the art will recognize that any spread in the pore size will contribute to slope in the pressure-volume curve. In some embodiments, the pore size distribution is sufficiently narrow that, above the Laplace pressure, the pressure-volume curve is essentially flat (e.g., volume decreases without a corresponding increase in pressure). For example, FIG. 1 corresponds to ideal monoporous (fixed diameter pores) particles, characterized by a single Laplace (or intrusion) pressure. In another embodiment, the pores are randomly sized. Alternatively, the pores may be deliberately sized but may have more than one size, for example, two or three. Where the pore size distribution is multimodal, the system will exhibit several Laplace pressures, one for each pore size. The desired pore size distribution will vary depending on the expected applied pressure and the size and shape of the object being protected. Depending on the application, the pore size may range from 2-1000 nanometers, but may also be higher; for example, 2-10 nm, 10-50 nm, 50-100 nm, or 100-200 nm, 200-1000 nm or higher.

For a given pore size, the energy storage capacity of a porous particle is proportional to porosity (total pore wall surface per unit volume). Therefore, the energy storage capacity may be increased by increasing particle porosity. However, as the porosity increases, the average wall thickness between adjacent pores decreases and the structural strength of the porous particle is reduced. Depending on the application, the maximum porosity may be optimized to prevent the particles from being pulverized when subjected to the maximum expected pressure. Thus, the particles may be between 20 and 80% porous, for example, between 20 and 30%, between 30 and 40%, between 40 and 50%, between 50 and 60%, between 60 and 70%, or between 70 and 80%. Depending on the application, the ratio of the particle diameter to the pore diameter may be at least 2: 1, at least 5:1, at least 10:1, at least 50:1, at least 100:1, at least 250:1, or at least 500:1, at least 1000:1, at least 2500:1, at least 5000:1 or even larger.

The ratios of incident energy transmitted through, dissipated in, and reflected from a given particle/fluid mixture depend on the properties of the mixture. The particle/carrier fluid mixture may be configured to store, reflect, and/or dissipate a certain amount of energy from an applied force, while transmitting a smaller portion of the energy to a protected object.

In some embodiments, the particle/carrier fluid mixture is configured to dissipate, transmit or reflect incident energy resulting from pressures of different magnitude, for example, energy resulting from applied pressures of at least 50 psi, at least 100 psi, at least 1000 psi, at least 2500 psi, or at least 10,000 psi. In some embodiments, the energy transmitted to the protected object is less than 70%, less than 50%, less than 20%, or less than 5% of the incident energy. In some embodiments, the particle/fluid mixture may be configured to accumulate energy rapidly (e.g., with high power—energy per unit time) but to release it at a lower rate (e.g., with lower power). The ratio of the power of the incident energy to that of the released energy may be at least 5, at least 10, or at least 100. The particle/carrier fluid mixture may be configured to optimize performance for a force applied with a frequency of at least 10 Hz, at least 100 Hz, at least 1000 Hz, at least 10,000 Hz, at least 100,000 Hz, or at least 1 MHz.

Particle Composition

The particles may be fabricated from practically any material—metals, ceramics, polymers, or semiconductor materials. The material should be sufficiently stiff that it will not deform significantly under pressure, (e.g., to prevent the pores from collapsing), and sufficiently friable to be ground. For example, the material should not deform significantly under imposed pressures during use but also simply under the weight of the material layered above it when "at rest" or being stored for production of protective items. Exemplary materials for use as particles include chromium-silica compounds, aluminosilicates, silica gel, glass, graphite, porous sodium borosilicate glass, alumina, and thermoset polymers such as acrylates (e.g., Lexan™), poly(vinyl chloride) and Bakelite. Representative examples include controlled porosity glass, available from Prime Synthesis (Aston, Pa.) and Millipore (Burlington, Mass.), and silica gel available from Waters Corp. (Milford, Mass.). Porous metals may be obtained from companies such as Mott Corporation, Purolator, Solea SAS, and Inco.

Surface Composition

The pores may be rendered lyophobic by coating them with any of a variety of materials. The coating may adhere to the pore walls sufficiently strongly that the motion of the fluid flowing into and out of the pores under pressure does not shear the coating from the pores. The thickness of the coating may be sufficiently great to provide coherence without clogging the pores. In some embodiments, the coating is about 1 nm thick. In one embodiment, the pores may be coated with poly(tetrafluoroethylene) in much the same way that cookware is. Alternative coating materials include petroleum gel, hydrophobic polymers, silicone compounds, or fluorinated organic compounds. In another embodiment, the pore walls may be coated with a self-assembled monolayer (SAM) including a lyophobic end group. In general, SAM-forming molecules have three sections—an anchor, a tether, and an end group. The anchor retains the molecule on a substrate. The tether extends out from the anchor in a linear chain, for example, a hydrocarbon chain. The tether is generally inert with respect to subsequent processing steps or interactions, although it is not required to be so. Any tether that does not disrupt SAM packing and that allows the SAM layer to be somewhat impermeable to the fluid is suitable. For example, a saturated or unsaturated, linear or branched alkyl, aryl, or other hydrocarbon spacer may be used. Any combination of these functional groups may also be used in the tether. Exemplary tethers include long chain (e.g., $C_4$-$C_{17}$ or more) hydrocarbon groups. The tether may also be at least partially halogenated, e.g., with fluorine. The chemistry of the tether should render the tether material lyophobic with respect to the fluid. For example, a hydrophobic tether may be employed when water is employed as the fluid.

An end group is at the opposite end of the molecule from the anchor, adjacent to the tether, and comprises a functionality which confers a specific surface property on the assembled monolayer, which functionality is typically exposed when the SAM is formed. End groups with halogenated and aliphatic groups will tend to be hydrophobic. Aromatic groups may also be employed. For example, alkyl, alkenyl, alkynyl, aryl, —$(CF_2)_nCF_3$ (where n=1-20), olefin, hydrocarbon, fluorinated hydrocarbon, or other functionalities may be exploited as part of the end group. Alternatively, if no specific terminal group is chosen, the end of the tether essentially forms the end group. For example, hydrocarbon tethers present a methyl end group, while a halogenated or hydroxylated hydrocarbon will present a halogenated or hydroxylated end group. In one embodiment, a functional group is retained on the last few carbons of the tether, so that the end group of the molecule is not a single group but is a section of the molecule. The term "fluorinated hydrocarbon" is meant to refer to partially and fully fluorinated derivatives, in addition to perfluorinated derivatives of the above-described hydrocarbon groups. A wide variety of functionalities that may be used to modify the chemical properties and methods of coating a surface with a SAM are described in U.S. Pat. Nos. 5,776,748, and 5,079,600, the entire contents of which are incorporated herein by reference.

In one embodiment, the anchor group has a single functionality that attaches to the substrate, for example, amine or dimethyl-methoxysilane. Alternatively, multifunctional anchors such as trimethoxysilane may be employed. Multifunctional anchors may increase the adherence of the SAM to the surface both by providing extra bonds to the surface and by increasing the coherence of the SAM, by linking adjacent SAM-forming molecules. Any anchor group that is used to anchor a SAM may be used to form a monolayer protective coating using the techniques of the invention. For example, organosilanes or carboxylic acids may be deposited on silicon, glass, silica, alumina or any substrate with an oxidized surface. Metals may be patterned by forming thiol, sulfide, and disulfide bonds with molecules having sulfur-containing anchor groups. Of course, SAMs may be deposited on semiconductor materials such as germanium, gallium, arsenic, and gallium arsenide.

Carrier Fluids

The particles, with the lyophilic surface and lyophobic pores, do not accumulate energy on their own. Rather, they are combined with a carrier fluid that penetrates the pores when the Laplace pressure is exceeded. An ideal fluid from a viscosity and surface tension standpoint is mercury; however, mercury may not be suitable for some applications due to its density and toxicity. For glass and other hydrophilic materials (e.g., with interior surfaces rendered hydrophobic through suitable coatings), water or alcohols may be used as the carrier fluid. Other fluids that are suitable for use with the invention include but are not limited to aqueous, polar, and electrolytic solutions, ethylene glycol, oil, liquid metals or alloys, low temperature eutectics, e.g., gallium-indium, gallium-indium-lead, gallium-lead-tin or low melting point Wood's metal alloys. The choice of fluid depends partially on the temperature at which the system will be used. Some alcohols, such as ethanol and isopropanol, have lower melting points than water and may be used at colder temperatures. Of course, they will also boil at lower temperatures and may not be suitable for use in high temperature environments. One skilled in the art will recognize that fluids may be combined to change their boiling points, melting points, or viscosities. Alternatively or in addition, it may be desirable to use additives to optimize other properties. For example, a biocide may be added to water to prevent the growth of bacteria that may coat the pore walls or the outer surfaces of the particles, or a solute (e.g., salt) may be added to water to reduce its freezing point. Mixtures of solvents may also be used to modify the viscosity or surface tension of the fluid or to adjust boiling or freezing points. The viscosities, melting points, and boiling points of a plethora of fluids are listed in the *Handbook for Chemistry and Physics* (D Lide, Editor in Chief, 1991, CRC Press, Boca Raton), the entire contents of which are incorporated by reference herein. One skilled in the art will also recognize that the melting points and boiling points for a wide variety of mixtures of solvents may be found by reference to any encyclopedia of binary phase diagrams, e.g., *Phase equilibria and phase diagrams of electrolytes* (H. Engels, 1990, Dechema, Frankfurt/Main), the entire contents of which are incorporated herein by reference.

Encapsulation

The carrier fluid and the particles may be mixed and retained in a container. The particles may agglomerate, but the system will still be able to accumulate energy so long as a portion of the exterior surface area of the particles is accessible to the carrier fluid. The system may have a 1:1 volume fraction of particles and fluid or a different ratio. One skilled in the art will recognize that an economic limit of the particle/fluid ratio is the internal volume of the pores—there is no need to have more pore volume than the available volume of fluid to fill the pores. There should also be sufficient fluid to completely surround (e.g., "cover") all the particles and to fill the inter-particle space between agglomerated particles. A small amount of excess fluid is not detrimental to the operation of the system; large amounts of excess fluid will unnecessarily increase the volume and weight of the resulting system, and may eventually compromise some aspects of its performance. The volume of particles desired may be determined with respect to the desired energy accumulation capacity of the system.

In one embodiment, the mixture of the carrier fluid and particles is contained in a cylinder with a piston. For example, piston cylinders containing a particle-fluid mixture according to an embodiment of the invention may be disposed behind a car bumper. When the car hits an object head-on, the piston cylinder will accumulate and then reflect, transmit or dissipate energy from the impact. Alternatively or in addition, such piston cylinders may be disposed on traffic barriers, such as those at interchange ramps, or used to create shock absorbers or bumpers for cars or docks at marinas.

In another embodiment, the mixture is encapsulated in a shell of a compliant material, such as but not limited to polyurethane, nylon, polyisoprene, polyisobutylene, polysiloxane, thermoplastic polyetheresters and polyetheramides, acrylontrile-butadiane-styrene rubbers, polybutadiene-polystyrene co-polymers, styrene-butadiene terpolymers with unsaturated carboxylic acids, acrylonitrile-butadiene copolymers, isobutylene-isoprene copolymers (e.g., butyl rubber), styrene-isoprene copolymers, EPM and EPDM elastomers (ethylene-propylene monomer or ethylene-propylene-diene monomers), blends of any of these, or co-polymers of any of these. The shell should be sufficiently flexible that it transmits the force of an impact without rupturing, but not so thick that the resulting capsules cannot be packed to a desired density about an object being protected. It is also desirable that the shell be sufficiently thick that the capsules do not burst under the weight of a volume of capsules in a container. The shell need not be capable of accumulating or reflecting the impact energy, since this is the task of the carrier fluid-particle mixture contained within the shell. One of skill in the art will recognize that the thickness of the shell will depend both on the elastic modulus of the shell material and the size of the shell. In some embodiments, the diameter of the capsule is about 1 cm, but the capsule may be smaller or larger depending on the shell thickness and the desired application. Multilayer shell walls are also appropriate.

In one embodiment, the carrier fluid-particle mixture is encapsulated in polyurethane shells in much the same manner as drugs are encapsulated in softgel capsules. Twin sheets of the encapsulating material are brought together and a bolus of the particle-fluid mixture is injected between them. A trepan is used to punch out the bolus in such a manner that the edges of the encapsulating material seal together. For example, the encapsulating material may be incompletely polymerized, and the seal may be formed by the formation of crosslinks or polymer chains across the edge. Alternatively, the encapsulating material may be melted or at least rendered flowable, and flow of the material across the seam, followed by cooling below the glass transition temperature, may seal the capsule. The deployed shell material is preferably insoluble in the liquid part of the contained fluid.

Figure 3:
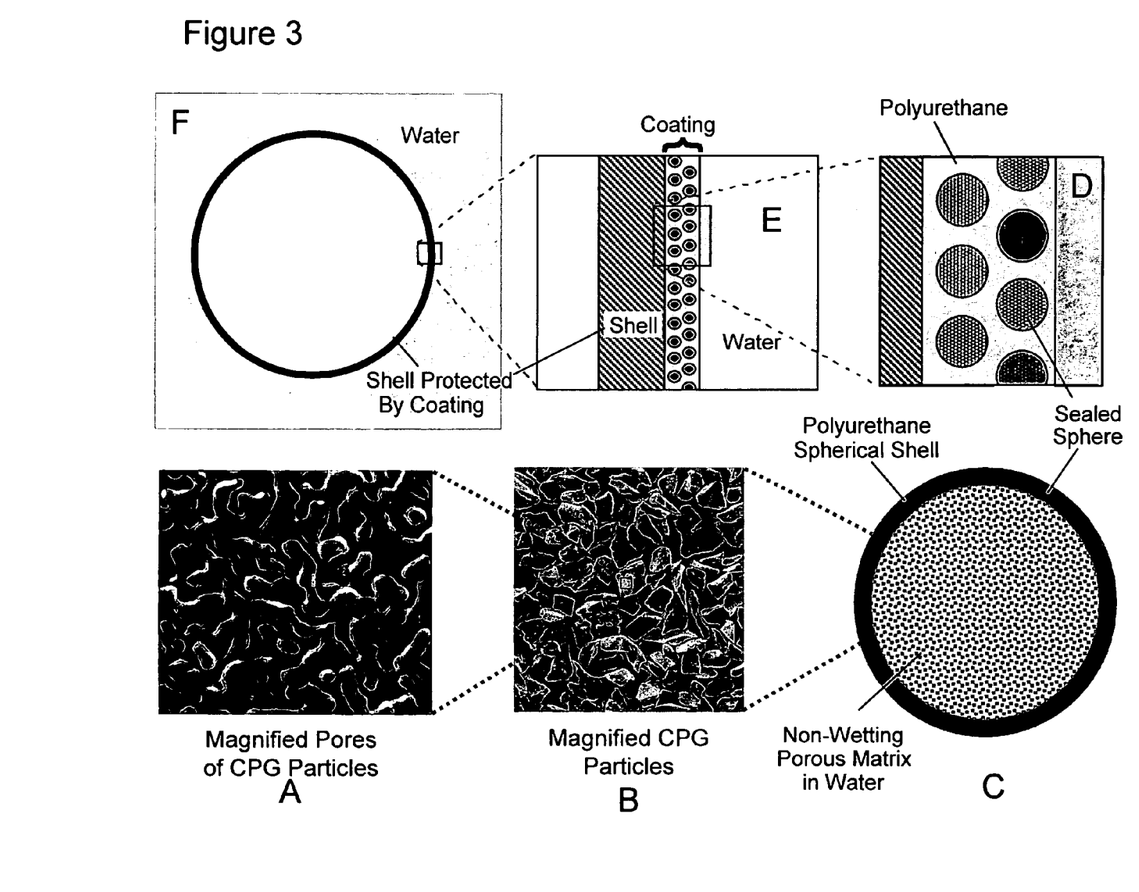

The capsules themselves may be further embedded in a matrix of compliant material to form a layer of energy accumulator (see FIG. 3). For example, the capsules may be combined with a prepolymer of the sheet material, which prepolymer may then be polymerized to embed the capsules in a solid, flexible matrix. The mixture may be extruded or otherwise shaped into practically any shape, e.g., sheets, tubes, hemi-cylinders, shells of various configurations (e.g., partial spheres or spheroids), rods, strands, or coils. In one embodiment, capsules containing the particle/fluid mixture are combined with a polyurethane prepolymer, following which the polyurethane is crosslinked (FIG. 3C, D). Any material that may be used to encapsulate the particle/fluid mixture may also be combined with capsules to make a sheet. Of course, the capsules and the sheet need not contain the same material. One skilled in the art will recognize that the ratio of the matrix material to the capsules may be determined by the desired energy accumulating capacity of the system. A higher fraction of capsules may increase the costs while providing energy accumulation capacity beyond the needs of the user. The polymer-embedded capsule "composite" may be wrapped around an object to protect it from shock waves or impacts (e.g., FIG. 3E, F). For example, relief packages or other materials that are being dropped from aircraft may have a layer of a polymer/capsule sheet on the bottom to absorb the force of impact. The legs of sea-based oil derricks may also be wrapped in a sheet according to an embodiment of the invention.

EXAMPLES

Example 1

Quasi-Static Testing of an Exemplary System

A number of particle/carrier fluid mixtures according to embodiments of the invention were tested quasi-statically in order to identify promising candidates for shock mitigation demonstration tests. The test results for an exemplary sample are summarized below.

A quantity (~3.7 g) of particles of controlled porosity glass (Millipore, Burlington, Mass.) (see FIGS. 3A and 3B) with PTFE coated pores (Prime Synthesis) were combined with water (~6.2 g) under vacuum (to reduce the amount of air in the pores and interparticle spaces) and contained in a sealed, air-free cylindrical container about 1-inch OD having a thin polyethylene wall.

The container was placed into a mercury porosimeter manufactured by Quantachrome Instruments (Boynton Beach, Fla.). A description of a mercury porosimeter may be found in S. Lowell and J. Shields, "Powder Surface Area and Porosity", Chapman and Hall, (1991) and P. Webb and C. Orr, "Analytical Methods in Fine Particle Technology", Micrometrics, (1997), the entire contents of both of which are incorporated herein by reference. The pressure-volume response curve of the sample was measured through 6 consecutive high-pressure cycles, 0-10,000 psi. The measurements were conducted quasi-statically, i.e., with each cycle lasting several minutes, and the measured pressure-volume response curve, which was found to be repeatable, is presented in FIG. 4. It should be noted that the FIG. 4 horizontal axis displays volume change, in contrast to FIG. 1, which displays total volume. For this sample, the measured Laplace (intrusion) pressure increases gradually from ~1,200 to 1,500 psi over the ~1.5 cc volume change, indicating a relatively narrow distribution of pore radii. Once the pores are totally filled (near DV=1.57 cc), the slope increases abruptly, reflecting the high stiffness (low compressibility) of the fluid/solid components of the system. The decompression part of the cycle features an extrusion pressure, which is lower than the intrusion pressure, as expected. The area within the closed curve represents the energy absorbed during a single cycle.

Example 2

Testing of an Exemplary System

Figure 4:
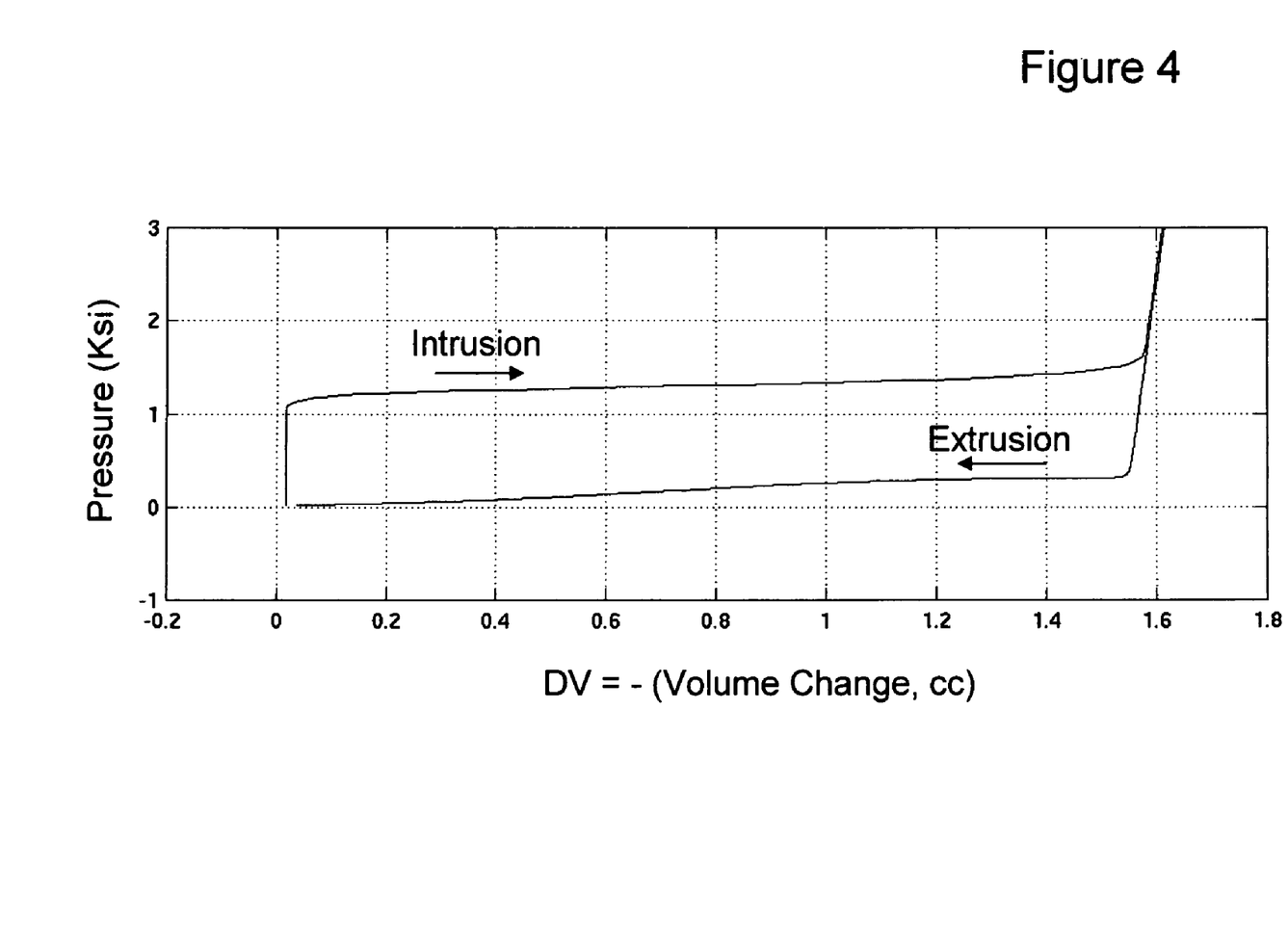
FIG. 4 is a graph illustrating the volume change of a particle/carrier fluid mixture according to an embodiment of the invention during quasi-static pressure cycling between 0 and 10,000 psi.
Figure 5:
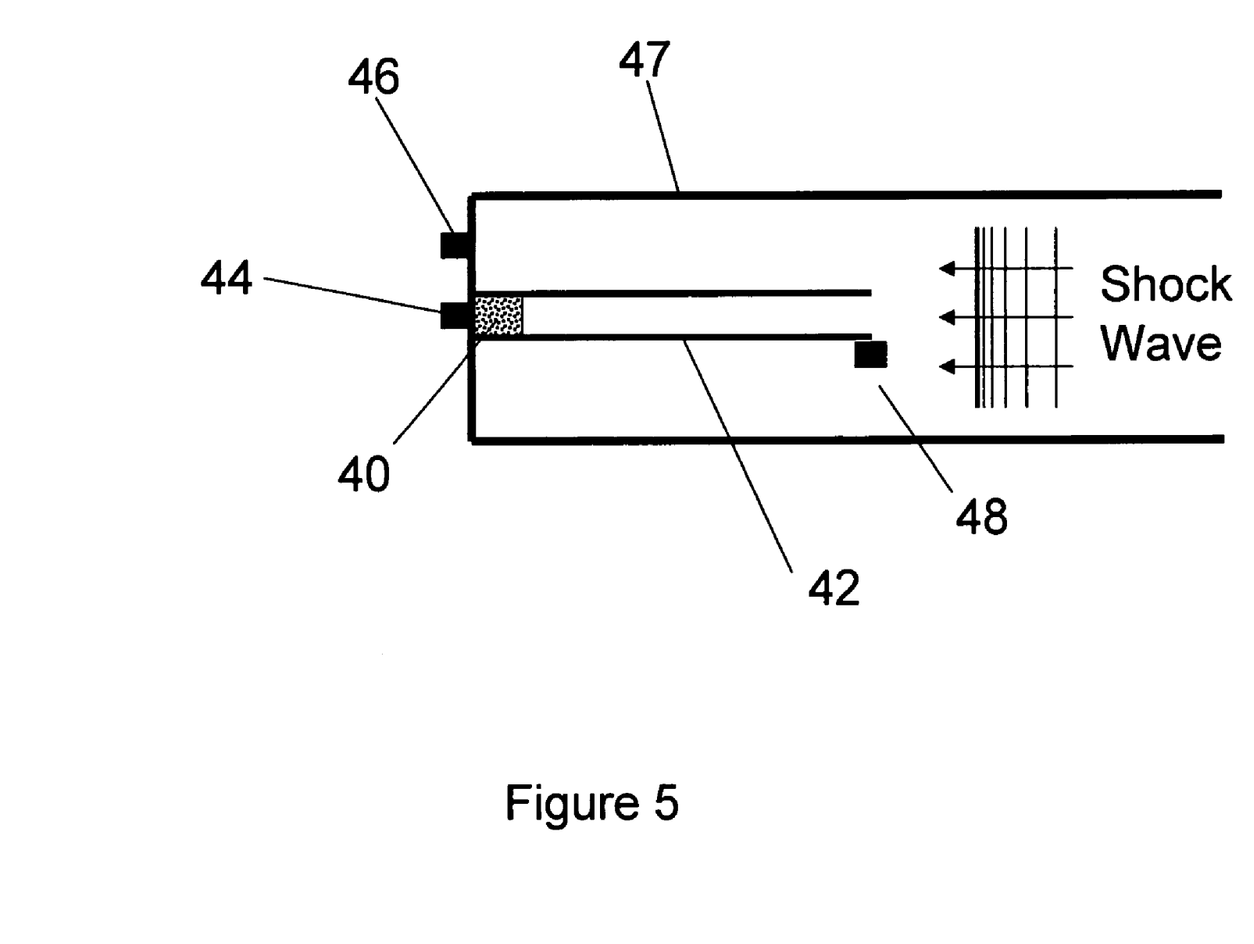
FIG. 5 is a schematic of a shock tube apparatus for testing a capsule of a particle/carrier fluid mixture according to an embodiment of the invention.
Figure 6A:
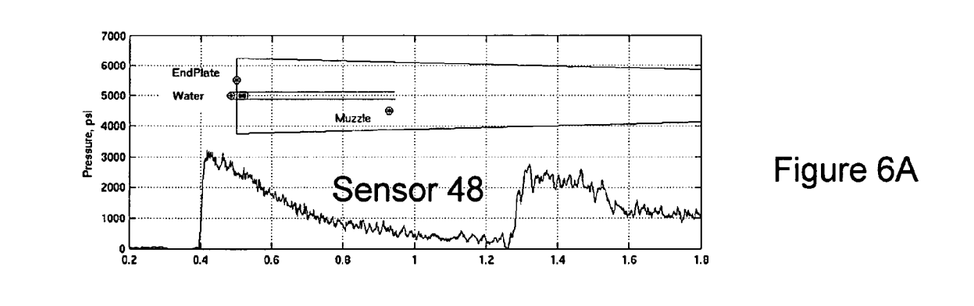
FIGS. 6A-6C show the measured pressure when an encased water sample is in the shock tube.
Figure 6B:
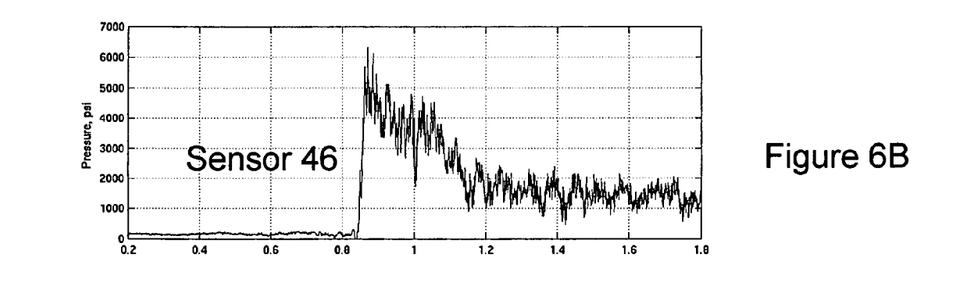
Figure 6C:
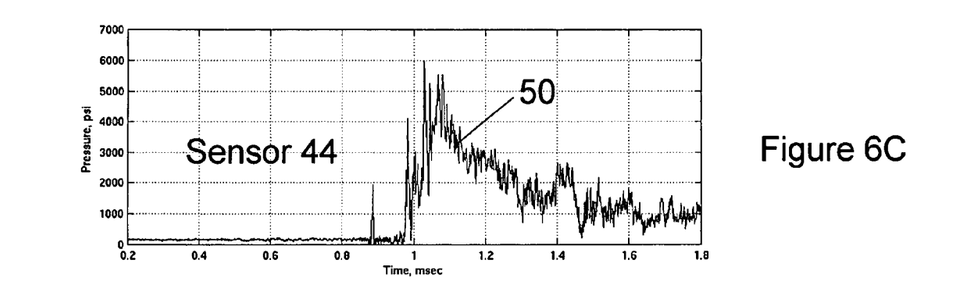
Figure 6D:
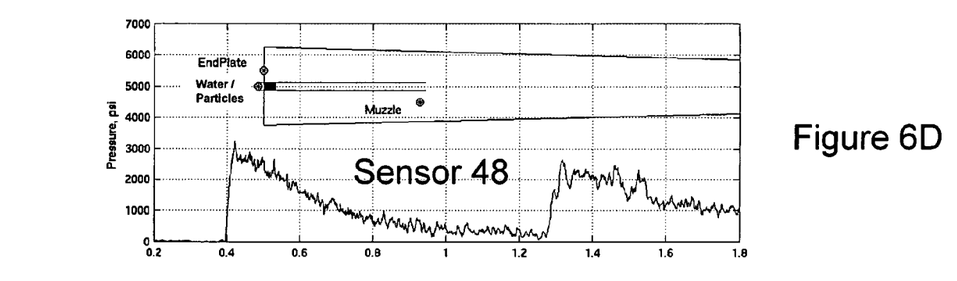
FIGS. 6D-6F show the measured pressure when a particle/carrier fluid mixture according to an embodiment of the invention is in the shock tube.
Figure 6E:
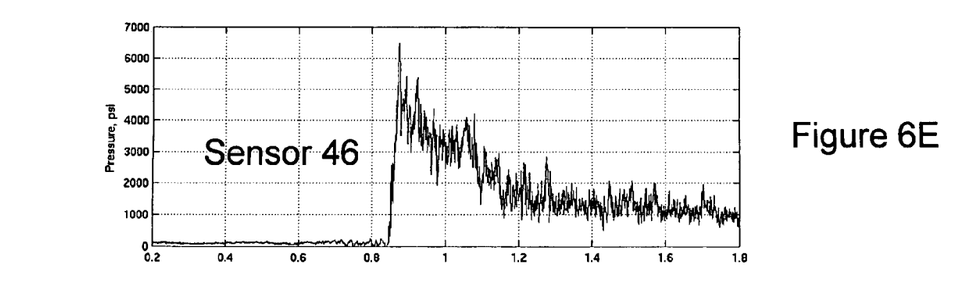
Figure 6F:
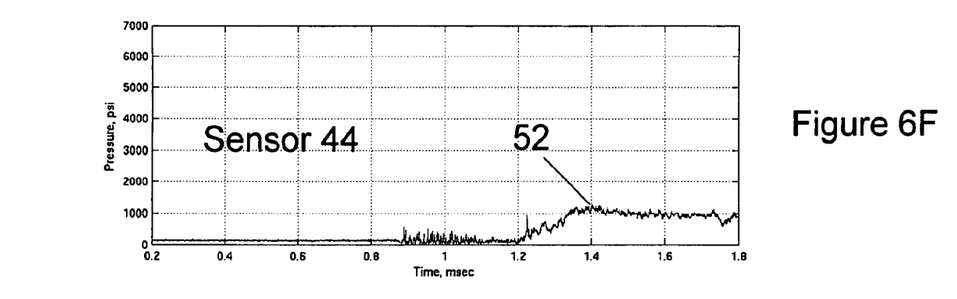

A quantity (~3.5 g) of particles of controlled porosity glass (Prime Synthesis, Aston, Pa.) (see FIGS. 3A and 3B) with PTFE coated pores (Prime Synthesis) were combined with water (~6 g) under vacuum and contained in a sealed, substantially air-free cylindrical container about 1-inch OD having a thin polyethylene wall. The container 40 was placed within a 1-in ID tube (42; FIG. 4) installed along the centerline of a 10-in ID shock tube 47 (FIG. 5) and pressure sensors disposed behind the container (44) next to the container but outside the 1-inch tube (46) and at the origin (48) of a free-propagating >2500 psi shock wave. This arrangement ensured that the sample 40 interacted exclusively with the shock wave propagating within the 1-inch tube, i.e. that the pressure measured by sensor 44 was not affected by the shock wave propagating outside the 1-inch tube and impinging on sensor 46. FIG. 6 shows the pressure measured by pressure sensors 48 (FIG. 6A), 46 (FIG. 6B), and 44 (FIG. 6C) when the shock wave was directed against a control sample with the fluid but no particles. FIGS. 6D-F show the pressures measured by the same pressure sensors when the shock wave was directed against a sample including internally hydrophobic porous particles. The porous particles dramatically reduced the amount of pressure (and energy) transmitted through the container 40 to pressure sensor 44, while the pressures measured by the other two sensors are practically indistinguishable for the two tests.

Other embodiments of the invention will be apparent to those skilled in the art from a consideration of the specification or practice of the invention disclosed herein. It is intended that the specification and example be considered as exemplary only, with the true scope and spirit of the invention being indicated by the following claims.

What is claimed is:

1. A system for accumulating mechanical energy, comprising:
   a carrier fluid; and
   a plurality of particles distributed therein, the particles being broken fragments of a lyophilic starting material having at least one pore open to an exterior of the starting material and defined by an interior surface of the starting material,
   wherein the exterior surface of the starting material and the interior surface of the starting material comprise a coating that is lyophobic with respect to the carrier fluid.

2. The system of claim 1, further comprising a sealed hollow shell of a compliant material in which the carrier fluid and the particles are contained.

3. The system of claim 1, further comprising a plurality of hollow shells of compliant material in which the carrier fluid and the particles are contained.

4. The system of claim 3, further comprising a compliant matrix material in which the plurality of hollow shells is embedded.

5. The system of claim 3, wherein the plurality of hollow shells are suspended in a second carrier fluid.

6. The system of claim 1, wherein the carrier fluid and the particles are contained in a piston cylinder.

7. The system of claim 1, wherein the exterior surface of the starting material is hydrophilic and the coating is hydrophobic.

8. The system of claim 1, wherein the system is configured to accumulate energy from an external force applied at a pressure of at least 50 psi while transmitting less than 70% of the energy to an object about which the system is disposed.

9. The system of claim 8, wherein the system is configured to accumulate energy from an external force applied at a pressure of at least 100 psi.

10. The system of claim 8, the energy transmitted by the system is less than 50% of the incident energy.

11. The system of claim 1, wherein the system is configured to accumulate energy from an external force applied at a frequency of at least 10 Hz.

12. The system of claim 1, wherein the system is configured to accumulate energy from an external force applied at a frequency of at least 100 Hz.

13. The system of claim 1, wherein the starting material comprises controlled porosity glass, the coating comprises poly(tetrafluoroethylene) and the carrier fluid comprises water.

* * * * *

UNITED STATES PATENT AND TRADEMARK OFFICE
CERTIFICATE OF CORRECTION

PATENT NO. : 7,767,301 B2
APPLICATION NO. : 11/222140
DATED : August 3, 2010
INVENTOR(S) : Galaitsis It is certified that error appears in the above-identified patent and that said Letters Patent is hereby corrected as shown below:

Column 3, line 24, delete "OR" and replace with --OF--.

Column 4, line 66, delete "micron" and replace with --microns--.

Column 6, line 41, delete "strongly" and replace with --strong--.

Column 9, line 21, delete "and flow" and replace with --and the flow--.

Column 9, line 47, delete ", FIG." and replace with --, FIGS.--.

Column 10, line 41, delete "1-in ID tube (42; FIG. 4) and replace with --1-inch ID tube 42 (FIG. 4)--.

Column 10, line 42, delete "10-in" and replace with --10-inch--.

Column 10, line 42, delete "and" and replace with --with--.

Signed and Sealed this

Ninth Day of November, 2010

David J. Kappos
*Director of the United States Patent and Trademark Office*